United States Patent
Fouqueray et al.

(10) Patent No.: US 8,365,366 B2
(45) Date of Patent: Feb. 5, 2013

(54) CLAMPING COLLAR HAVING A BELT MADE UP OF TWO INTERCONNECTED PORTIONS

(75) Inventors: Cyriaque Fouqueray, Romorantin (FR); Gérard Motteau, Chabris (FR); Guillaume Racoillet, Mur de Sologne (FR)

(73) Assignee: Etablissements Caillau, Issy les Moulineaux (FR)

( * ) Notice: Subject to any disclaimer, the term of this patent is extended or adjusted under 35 U.S.C. 154(b) by 554 days.

(21) Appl. No.: 12/504,999

(22) Filed: Jul. 17, 2009

(65) Prior Publication Data
US 2010/0037435 A1    Feb. 18, 2010

(30) Foreign Application Priority Data

Jul. 18, 2008   (FR) .................................. 08 54916

(51) Int. Cl.
*B65D 63/00* (2006.01)
*F16B 2/08* (2006.01)
*F16L 33/04* (2006.01)

(52) U.S. Cl. ........................ 24/284; 24/20 EE
(58) Field of Classification Search .................... 24/284, 24/285, 20 EE; 285/24
See application file for complete search history.

(56) References Cited

U.S. PATENT DOCUMENTS

| | | | | | |
|---|---|---|---|---|---|
| 910,385 | A | * | 1/1909 | Johnson | 24/20 EE |
| 1,047,376 | A | * | 12/1912 | Brynteson | 24/20 EE |
| 1,677,828 | A | * | 7/1928 | Howlett | 24/20 EE |
| 3,141,208 | A | * | 7/1964 | Stradella | 24/20 EE |
| 4,109,350 | A | * | 8/1978 | Acre | 24/284 |
| 2007/0272806 | A1 | | 11/2007 | Kim | |
| 2008/0019794 | A1 | | 1/2008 | Van Walraven | |

FOREIGN PATENT DOCUMENTS

| | | |
|---|---|---|
| DE | 27 01 014 A1 | 7/1978 |
| EP | 1 845 295 A | 10/2007 |
| WO | WO 2007/136158 A1 | 11/2007 |

\* cited by examiner

*Primary Examiner* — Robert J Sandy
(74) *Attorney, Agent, or Firm* — Kenyon & Kenyon LLP

(57) ABSTRACT

A clamping collar includes a belt that co-operates with a tightening member(s) and that is made up of two belt portions interconnected at their connection ends. Each of these connection ends has a joggle between an end segment and a coupling segment. The joggle is provided with a slot that extends transversely to a step. The connection ends are thus interlocked, the step of each connection end being disposed in the slot of the other end and the coupling segment of each of the ends being disposed against the end segment of the other end, so that the retaining surfaces belonging to respective ones of the two ends co-operate with each other.

22 Claims, 8 Drawing Sheets

CLAMPING COLLAR HAVING A BELT MADE UP OF TWO INTERCONNECTED PORTIONS

FIELD OF THE INVENTION

The present invention relates to a clamping collar comprising a belt that co-operates with tightening means.

BACKGROUND OF THE INVENTION

Conventionally, the belt of such a collar is made from a metal strip formed into a ring. Often, the belt is made in one piece. However, sometimes it is necessary for clamping collars to be used for clamping parts that are of very large diameter. For example, in the automobile sector, such parts can be Diesel Particulate Filters (DPFs) whose diameter can be about 30 cm or larger. In order to make collars of very large diameter with a one-piece ring-forming belt, it would be necessary for production tooling to undergo costly adaptation. Therefore, it can be desirable to make the belt as a plurality of belt portions that are connected together.

In addition, in general, it can be desirable to impart a modular structure to clamping collars, by enabling a plurality of belt portions to be assembled together in order to determine the appropriate diameter.

OBJECT AND SUMMARY OF THE INVENTION

An object of the invention is thus to propose a collar whose belt can be made up of a plurality of portions, and in which the portions in question can be interconnected simply and inexpensively without adversely affecting secure clamping and, in particular, without any risk of the portions coming apart when the collar is tensioned.

According to the invention, this object is achieved by the fact that the belt is made up of at least two belt portions suitable for being interconnected at their mutually adjacent ends or "connection ends", each of which connection ends has a joggle between an end segment and a coupling segment, the joggle of each connection end being provided with a slot that extends transversely from one of the peripheral edges of the belt to a step, by the fact that the collar of the invention is provided with at least one pair of retaining surfaces comprising a first retaining surface situated in the end segment of the first connection end and a second retaining surface situated in the coupling segment of the second connection end, and by the fact that, in order to interconnect said belt portions, the connection ends are interlocked, the step of each connection end being disposed in the slot of the other connection end so that the coupling segment of each of the connection ends is disposed against the end segment of the other connection end, and, so that the retaining surfaces of the first pair co-operate with each other.

By interlocking the two connection ends, it is possible to make their interconnection more secure. In particular, inserting the step of one end into the slot of the other end makes it possible to avoid any untimely separation under the effect of forces exerted along the circumference of the belt. As regards forces exerted transversely to said belt, the first and second retaining surfaces oppose separation under the effect of such forces, while also contributing to resistance to forces exerted circumferentially.

Advantageously, the collar is further provided with a second pair of retaining surfaces comprising a first retaining surface situated in the end segment of the second connection end and a second retaining surface situated in the coupling segment of the first connection end, and the retaining surfaces of the second pair co-operate with each other when the connection ends are in the interlocked state.

By providing a second pair of retaining surfaces, it is possible to improve the strength of the interconnection between the connection ends of the belt portions.

Advantageously, for the or each pair of retaining surfaces, one of the retaining surfaces comprises an edge portion of a retaining window and the other retaining surface comprises a hook suitable for co-operating by fastening with said edge portion to oppose relative movement of the connection ends in a first direction.

Implementing retaining surfaces in this way is extremely simple and inexpensive. It can be achieved using production tooling that is easy to manufacture and to control.

Advantageously, the hook is formed on an edge portion of a fastening window.

The retaining window and the fastening window can be made merely by punching in the portion of belt in question, in extremely simple manner. The hook can be obtained by die-stamping or indeed by folding in an edge portion of the fastening window.

Advantageously, opposite from said hook, the fastening window has a wedging edge suitable for co-operating with a wedging surface belonging to the other connection end to oppose relative movement of the connection ends in a second direction that is opposite from the first direction.

The presence of the wedging edge and of the wedging surface improves resistance to forces exerted along the periphery of the belt, in particular forces tending to make the connection ends overlap to a greater extent.

Advantageously, the edge portion of the retaining window is deformed radially to present a recess in which the height of the joggle is compensated at least in part. In which case, the hook is advantageously folded inside the recess.

By means of these features, it is possible to prevent the fastening from locally forming a radial height that is too large. This thus contributes to preventing the interconnection from being synonymous with a radial dimension that is too large. In addition, the recess makes it possible to wedge the hook and to align the connection ends properly relative to each other. In general, the invention makes it possible to prevent the two connection ends from moving relative to each other when they are interlocked, so that the resulting assembly behaves rigidly. This effect is particularly significant because of the hook being pressed into the recess.

Advantageously, the edge of the fastening window is provided with two tongues, one of which forms the hook.

The hook is easy to form in a tongue, e.g. by folding or die-stamping said tongue. As regards the other tongue, it can serve to form the above-mentioned wedging edge. It can also be stood up so that it projects from one of the faces of the belt, in particular from the inside face thereof. If the tongue projects from the outside face, it can co-operate with complementary connection means. If it projects from the inside face, it can co-operate with predefined zones of the object that is to be clamped by the collar, so as to wedge the collar in rotation relative to said object.

Advantageously, said edge portion of the retaining window and the hook are positioned transversely.

Thus, the fastening edge of the hook is positioned transversely.

Advantageously, the connection ends are identical.

The fact that the connection ends are identical facilitates manufacture of the collar, it thus being possible for the two connection ends to be manufactured using the same tooling, or indeed using identical tooling.

BRIEF DESCRIPTION OF THE DRAWINGS

The invention can be well understood and its advantages appear more clearly on reading the following detailed description of embodiments that are shown by way of non-limiting example. The description refers to the accompanying drawings, in which.

MORE DETAILED DESCRIPTION

Figure 1:
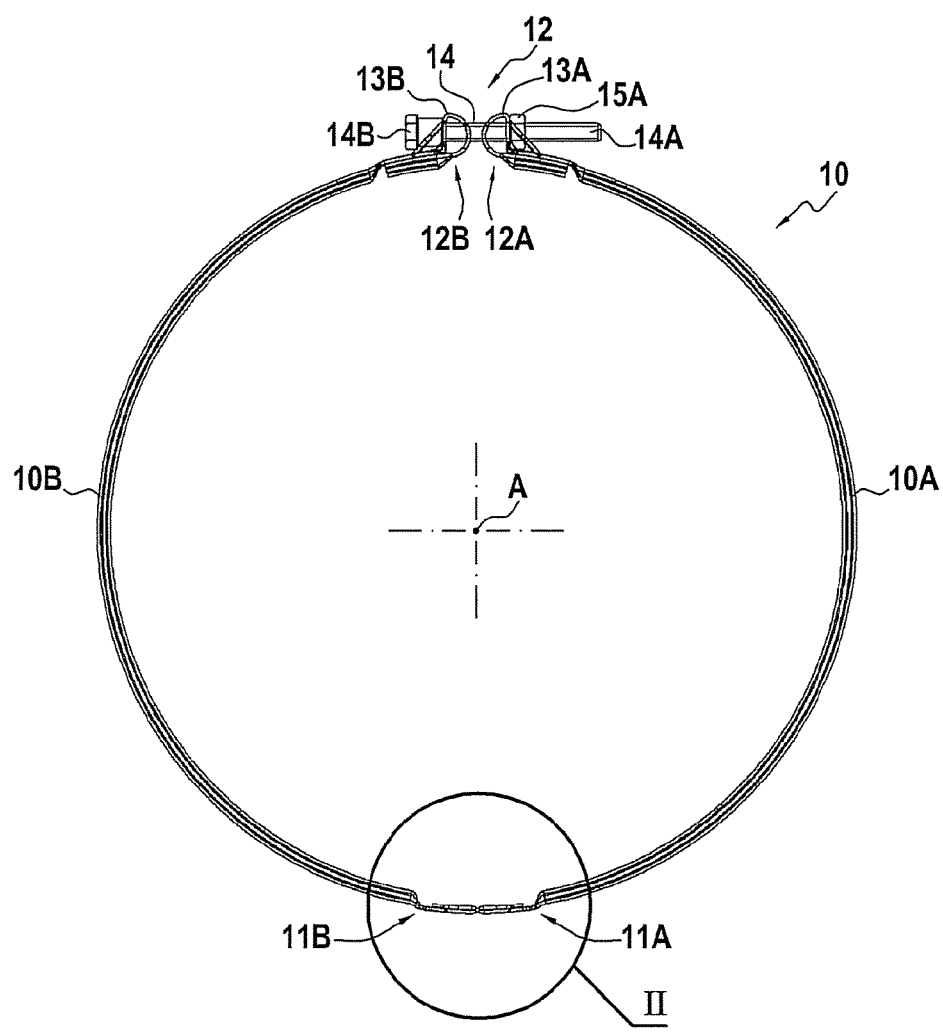
FIG. 1 is a side view of a first embodiment of a collar of the invention.

FIG. 1 shows a clamping collar comprising a belt 10 that co-operates with tightening means 12. The belt is made up of two belt portions, respectively 10A and 10B, each of which is formed from a strip of metal that is rolled into a ring segment. The two belt portions are interconnected at their connection ends 11A, 11B.

The tightening means 12 are provided at the opposite ends, respectively 12A and 12B, of the belt portions. In this example, the tightening means comprise loops 13A, 13B formed at the respective ends of the belt portions, and a bolt 14 having a threaded shank 14A that is inserted across the loop 13A and that is retained therein by a nut 15A, while the head 14B of the bolt is retained in the loop 13B.

In particular, said tightening means can be of the type described and shown in French Patent Documents Nos. 2 902 174 and 2 902 175. As indicated in those patent documents, such tightening means enable the loops 13A and 13B to be made with integrally formed engagement walls against which the tightening can be performed rather than having to provide separate blocks or "gudgeons". Naturally, other tightening means could be provided, so long as they enable the diameter of the belt 10 to be reduced by a tightening effect.

Figure 2:
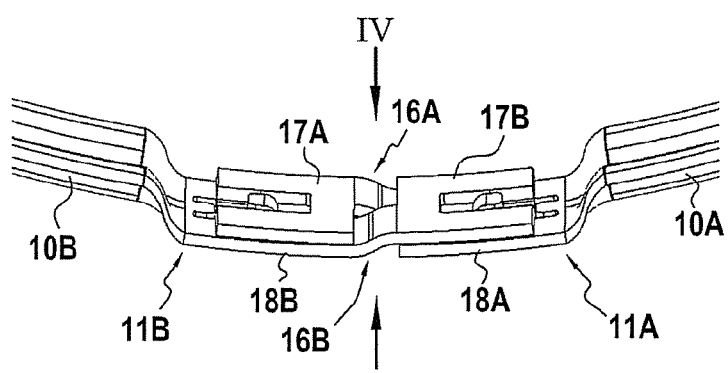
FIG. 2 is an enlargement in the zone II of FIG. 2.
Figure 3:
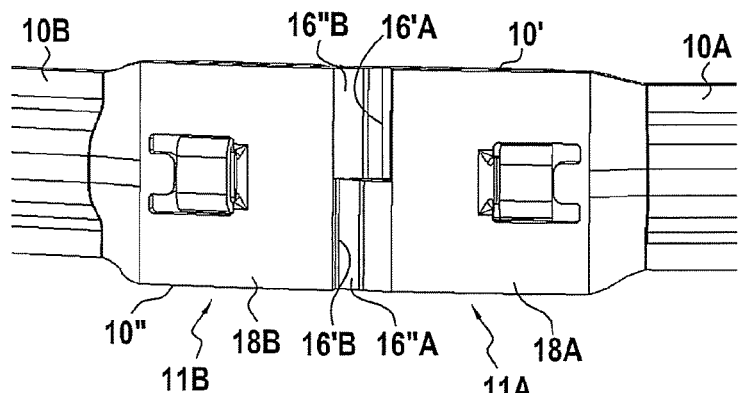
FIG. 3 is a view seen looking along arrow III of FIG. 2.

The connection ends 11A and 11B can be seen more clearly in FIG. 2. It can be seen that each them is provided with a respective joggle 16A or 16B between an end segment 17A or 17B and a coupling segment 18A or 18B. As can been seen more clearly in FIG. 3, the joggle of each connection end is provided with a slot 16'A or 16'B that extends transversely from a respective one of the peripheral edges of the belt, respectively 10' for the slot 16'A and 10" for the slot 16'B, to a step 16"A or 16"B. This shape can be seen particularly clearly in FIG. 7 for the connection end 11A, that figure clearly showing the slot 16'A and the step 16"A that extend transversely in alignment with each other to form the joggle 16A between the end segment 17A and the coupling segment 18A.

Figure 5:
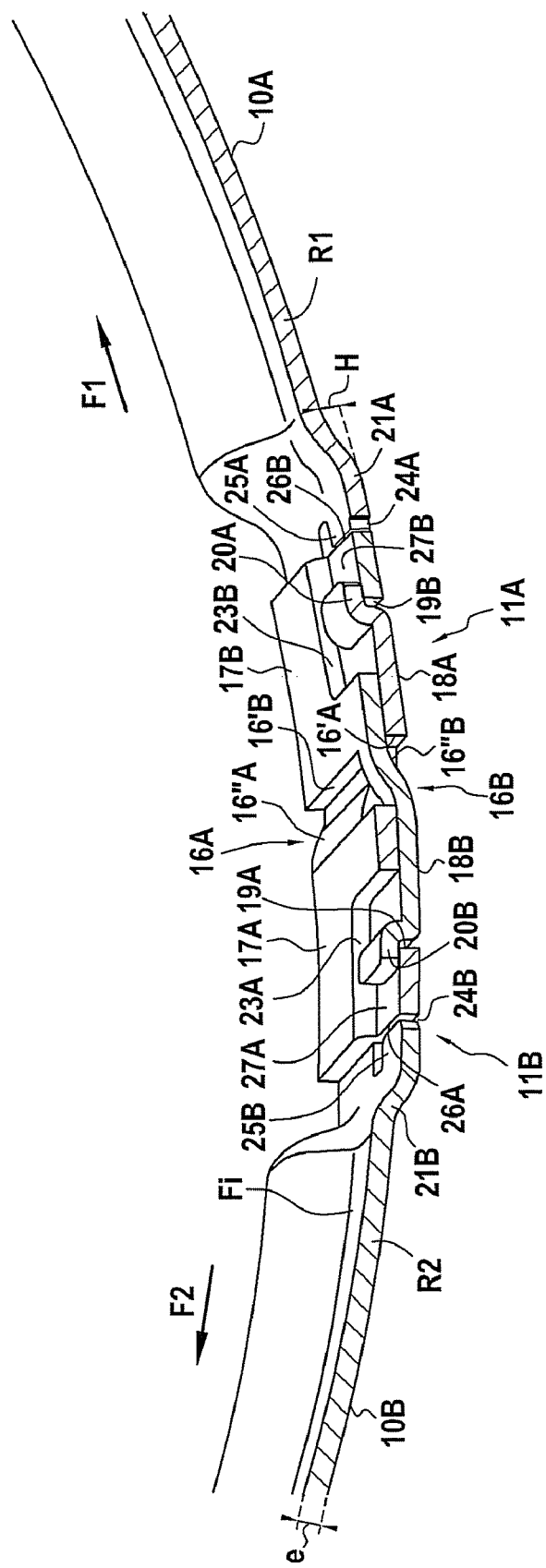
FIG. 5 is a view of the belt partially in circumferential section, as indicated by arrows V-V of FIG. 4.

As can be seen more clearly in FIG. 5, in order to interconnect the connection ends, a first pair of retaining surfaces is provided that comprises a first retaining surface 19A situated in the end segment 17A of the first connection end 11A, and a second retaining surface 20B situated in the coupling segment 18B of the second connection end 11B.

In the same way, a second pair of retaining surfaces exists that comprises a first retaining surface 19B situated in the end segment 17B of the second connection end 11B and a second retaining surface 20A situated in the coupling segment 18A of the first connection end 11A.

In order to be interconnected, the connection ends are interlocked. The step 16"A or 16"B of each connection end is disposed in the slot 16'B or 16'A of the other connection end. In this situation, the coupling segment of each of the connection ends is disposed against the end segment of the other connection end and the retaining surfaces of the above-mentioned first and second pairs co-operate mutually.

In particular in FIG. 5, it can be seen that the end segment 17A of the first connection end 11A is disposed against the coupling segment 18B of the second connection end 11B, and, similarly, that the end segment 17B of said second end is disposed against the coupling segment 18A of the first end.

In the example shown in FIGS. 1 to 5, the end segments 17A and 17B are disposed on the insides of the respective coupling segments 18B and 18A. The inside corresponds to that face of the belt that faces the axis A of the collar (see FIG. 1). It can be understood that, for each connection end 11A, 11B, the joggle 16A, 16B offsets the respective end segment 17A or 17B inwards relative to the respective coupling segment 18A or 18B. In this way, in the interlocked state, the coupling segments 18A and 18B are situated substantially in alignment with each other along the circumference of the belt, and, similarly, the end segments 17A and 17B are situated in alignment with each other along said circumference.

In this example, the coupling segment 18A of the first connection end 11A is defined between the above-mentioned joggle 16A and an "upstream" joggle 21A. Thus, this coupling segment is offset radially outwards relative to the region R1 of the first belt portion 10A that is adjacent to the connection end 11A. Similarly, for the second connection end 11B, the coupling segment 18B is defined between the joggle 16B and an upstream joggle 21B that offsets the coupling segment 18B radially outwards relative to the region R2 of the second belt portion 10B that is adjacent to the second connection end 11B. The heights H of the various joggles are substantially equal and of the same order of magnitude as the thickness e of the strip from which each belt portion is formed, while being slightly greater than said thickness. In this way, the inside faces of the end segments 17A and 17B are situated substantially in alignment with the inside face Fi of the belt.

It should be noted that, in the example shown, the belt is of shaped section. It has a cross-section that is substantially V-shaped, enabling it to co-operate with radially projecting fastening surfaces of the object(s) that is/are to be clamped by means of the collar. However, in this example, the connection ends 11A and 11B are not of shaped section, and, ignoring the above-mentioned joggles, have cross-sections that are substantially flat. When it is stated that the inside faces of the end segments 17A and 17B are in alignment with the inside face Fi of the belt, the term "inside face" naturally refers to the trough in said inside face, on the inside face of the tip of the V-shape formed by the section of said belt.

Figure 4:
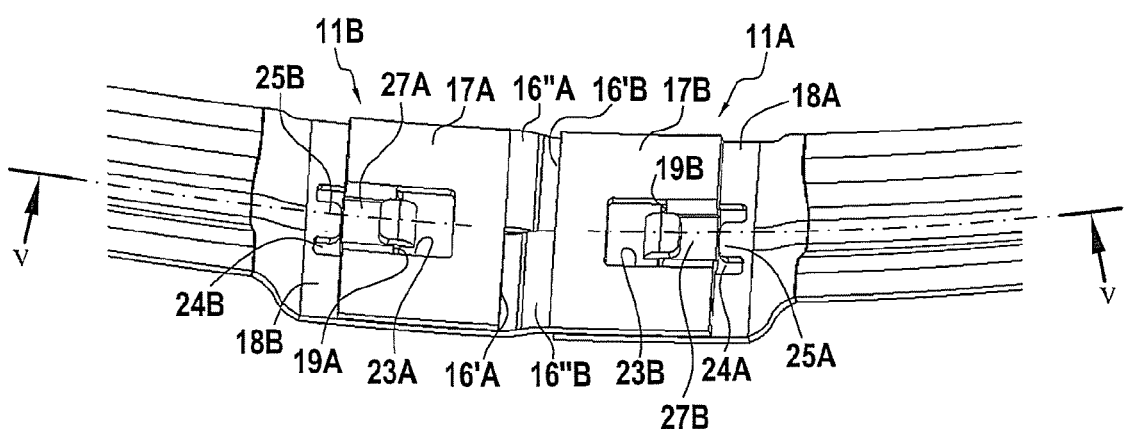
FIG. 4 is a view seen looking along arrow IV of FIG. 1.

As can be seen in particular in FIG. 4, respective retaining windows 23A and 23B are provided in respective ones of the end segments 17A and 17B. The respective retaining surfaces 19A and 19B are formed in edge portions of said windows. In this example, for each connection end 11A or 11B, the respective edge portion is the transverse edge that is further from the coupling segment of the connection end in question. The other retaining surface comprises a hook that, in this example, is provided in the coupling segment of each connection end, so as to co-operate with the retaining edge of the retaining window of the other connection end. Thus, the hook 20A is formed on an edge portion of a fastening window 24A (more clearly visible in FIG. 7) that is provided in the coupling segment 18A. Similarly, the hook 20B of the second connection end 11B is formed on an edge portion of a fastening window 24B provided in the coupling segment 18B.

The co-operation between the hook 20A and the edge portion 19B opposes relative movement of the two connection ends in a direction corresponding to the first connection end 11A moving in the direction F1 relative to the second connection end 11R. Similarly, the co-operation between the hook 20B and the edge portion 19A opposes relative movement in the opposite direction, corresponding to the second connection end 11B moving in the direction F2 relative to the first connection end 11A.

Opposite from the hook formed on one of its edge portions, each fastening window 24A or 24B has a wedging edge 25A or 25B that is suitable for co-operating with a wedging surface belonging to the other connection end so as to oppose relative movement of the connection ends in a second direction opposite to the above-mentioned first direction.

Figure 7:
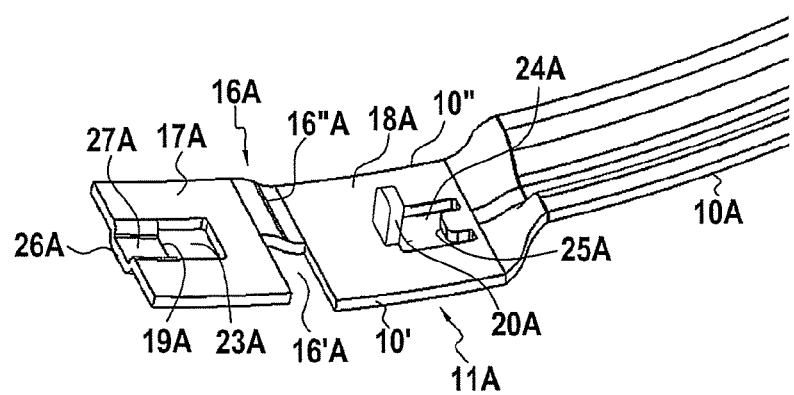
FIG. 7 shows the same connection end at the end of manufacture, with it ready to be assembled to the other connection end.
Figure 8:
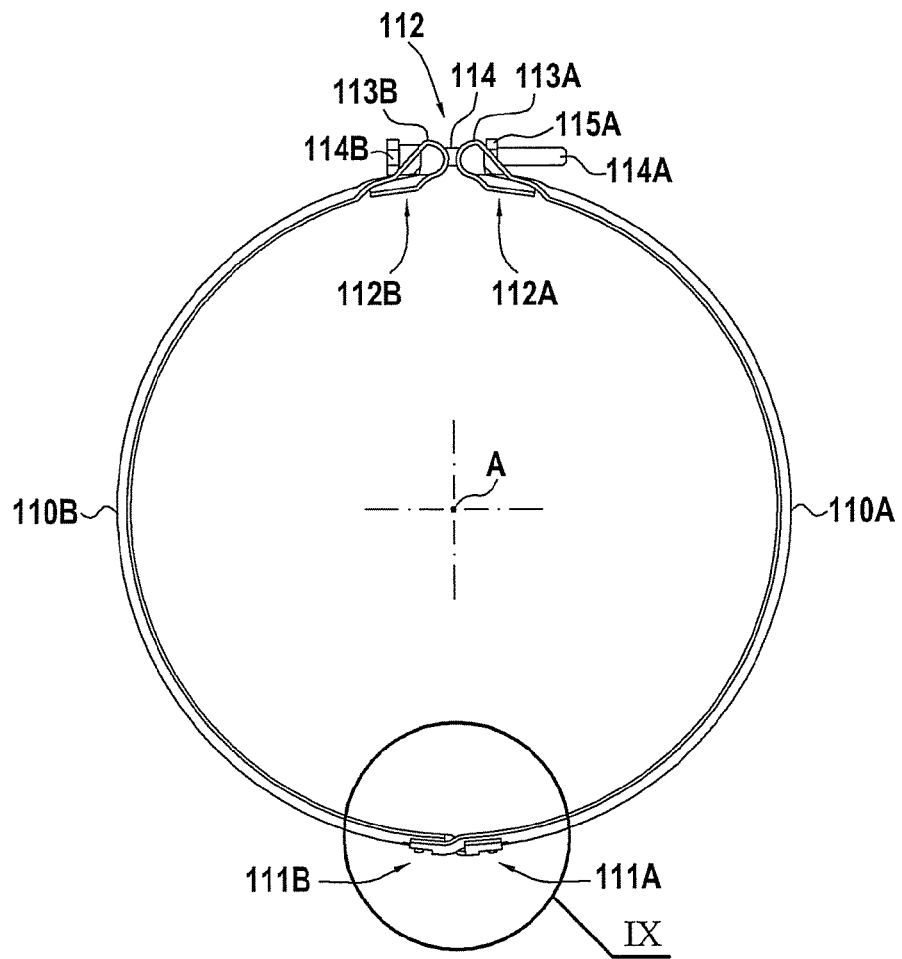
FIG. 8 is a side view showing a second embodiment of a collar of the invention.
Figure 9:
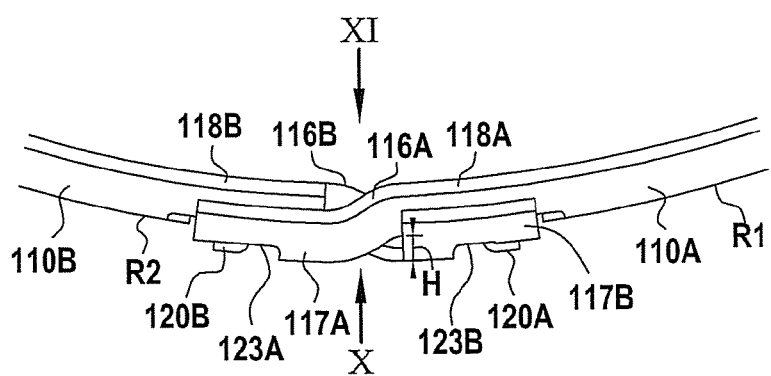
FIG. 9 is an enlargement in the zone IX of FIG. 8.
Figure 10:
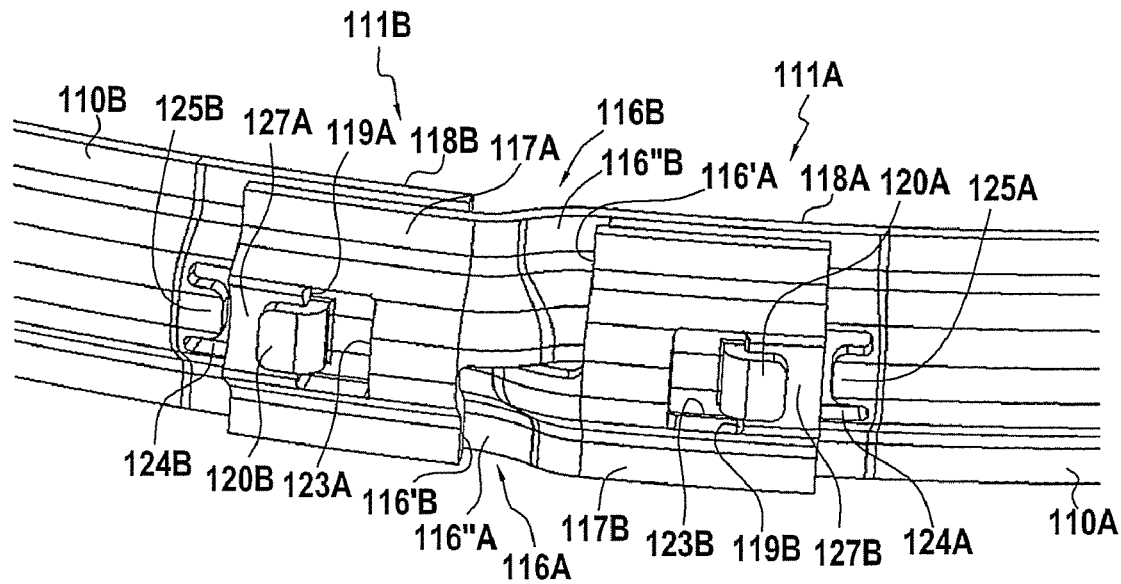
FIG. 10 is a view seen looking along arrow X of FIG. 9.

As indicated above, each retaining window 23A or 23B is formed in the end segment 17A or 17B of a respective connection end 11A or 11B. In which case, the wedging surface for each end segment 11A or 11B is formed at the free end 26A or 26B of the end segment in question. FIG. 7 thus shows the wedging surface 26A formed at the free end of the end segment 17A, and the wedging edge 25A formed on the edge of the window 24A that is opposite from the hook 20A. It can be seen, in particular in FIG. 5, that the mutually facing wedging edges and wedging surfaces are situated at very small distances apart when the connection ends are in the interlocked state, thereby limiting the relative movements in the direction opposite from the direction in which the relative movements are limited by co-operation between the hooks and the retaining surfaces.

Also in FIG. 7, it can be seen that the fastening window 24A has two tongues, one of which (20A) serves to form the hook while the other, via its free end 25A, forms the above-mentioned wedging edge. In this example, the two tongues are opposite each other and the wedging edge 25A is thus, like the hook, positioned transversely relative to the axis of the strip. The hook is said to be positioned transversely because it is provided on a transverse edge of the fastening window and because the folds that serve to form the hook are disposed in the same direction. However, the head is positioned circumferentially as can be seen, in particular, in FIG. 7.

FIG. 5 shows that the shape of the fastening window 24B is identical to the shape of the window 24A.

Returning to FIG. 7, it can be seen that the edge portion of the retaining window 23A that forms the retaining surface 19A is deformed radially to present a recess 27A. Said recess is deformed radially outwards and thus forms a die-stamped projecting portion on the outside face of the end segment 17A. It thus compensates, at least in part, for the height of the joggle 16A, the outside face of the above-mentioned die-stamped projecting portion being substantially on the same circumference as the outside face of the connection segment 18A. Similarly, the edge portion 19B of the window 23B presents a recess 27B that is analogous to the recess 27A (see FIG. 5).

Figure 6:
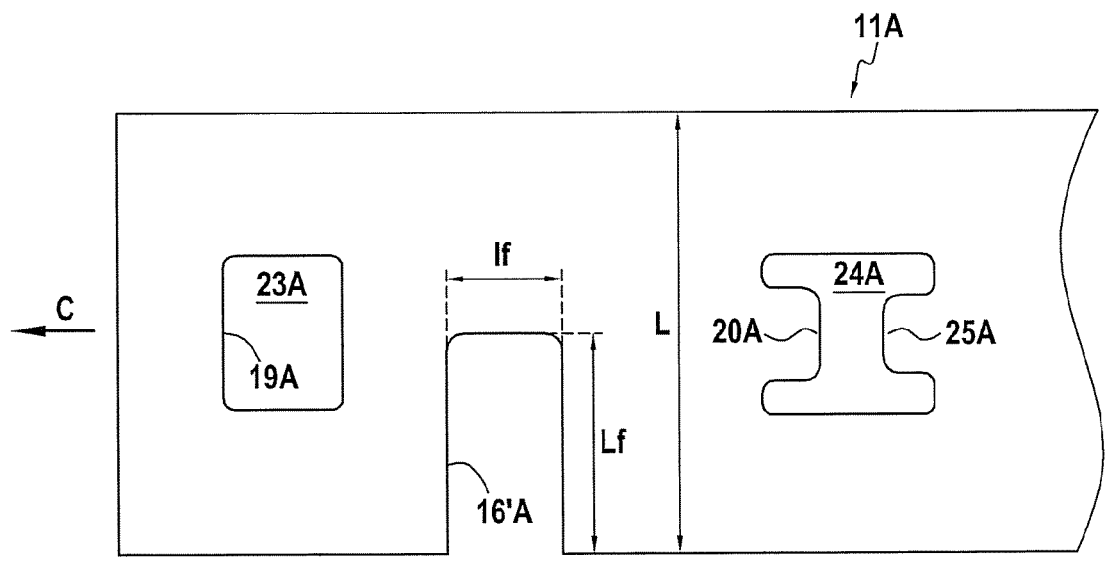
FIG. 6 is a plan view of a connection end as flat before it is assembled to the other end.

FIG. 6 shows the shape of the connection end 11A as flat. It is possible to recognize the slot 16'A that extends over a length Lf, measured transversely to the circumferential axis C of the strip, substantially equal to one half of the width L of said strip. For each connection end, the length of the respective slot 16'A or 16'B is very slightly greater than one half of the width L of the strip, while the respective step 16"A or 16"B extends over the remaining portion of the width. Thus, the steps can be disposed inside the slots when the connection ends are interlocked, while provision is also made for the interlocking to fit within the width L of the strip. In FIG. 6, the two facing tongues 20A and 25A of the fastening window 24A are situated in the plane of the strip. Thus, as flat, the fastening window is I-shaped. To form the hook, the tongue 20A is deformed so that it is upstanding relative to the plane of the strip by folding and/or die-stamping.

In FIG. 7, the tongue serving to form the hook 20A is stood up radially without significantly extending along the circumference axis. Prior to assembling together the connection ends, the same applies for the tongue serving to form the hook 20B. Thus, also taking account of the fact that the slots 16'A and 16'B are of sufficient width lf, it is easy assemble to together the connection ends 11A and 11B by interlocking, by causing said tongues to penetrate into the retaining windows 23B and 23A. Then, the free ends of the tongues can be folded over to form hooks 20A and 20B and come to be placed against the retaining surfaces 19B and 19A.

In this example, the respective hook 20A or 20B of each connection end is folded inside the corresponding recess 27A or 27B in the other connection end so as to be laid over against the end-wall of said recess. It can thus be seen, in particular in FIG. 5, that the hook does not give risk to any extra thickness on the inside faces of the interconnected connection ends.

A description follows of FIGS. 8 to 14, in which the elements analogous to the elements of the preceding figures are designated by like reference numerals, plus 100.

In particular, it is possible to recognize the two belt portions 110A and 110B and the connection ends 111A, 111B. The connection end 111A has a joggle 116A, with a slot 116'A and a step 116"A. A retaining window 123A is provided in the end segment 117A and has a retaining surface 119A formed by a transverse edge of said window. A fastening window 124A is provided in the coupling segment 118A and has a first tongue curved over to form the hook 120A, and a second tongue 125A opposite the first hook. The end segment 117A is distinguished from the coupling segment 118A by the joggle 116A that is made up of the slot 116'A and of the step 116"A.

The shape of the second connection end 111B is identical to the shape of the first connection end 111A. Thus, its end segment 117B is provided with a retaining window 123B, one edge of which forms a retaining surface 119B. Its coupling segment 118B is provided with a fastening window 124B in which one of the facing edges has a first tongue curved back to form the hook 120B, and a second tongue 125B. The end segment 117B is distinguished from the coupling segment 118B by a joggle 116B made up of a transverse slot 116'B and of a step 116"B.

In this second embodiment, the end segment 117A or 117B of a connection end 111A or 111B is disposed on the outside of the coupling segment 118B or 118A of the other connection end 111B or 111A, when the connection ends are in the interlocked state. More precisely, it can be seen, in particular in FIG. 9 that, for each connection end, the coupling segment 118A or 118B extends substantially in circumferential alignment with the region R1 or R2 of the belt that is adjacent to the connection end in question. This can also be seen clearly in FIG. 12, in which it can be seen that the inside faces of the coupling segments are thus in alignment with the inside periphery of the strip. In this example, these inside faces are, like the remainder of the belt, of shaped section so that they are substantially V-shaped in cross-section so as to enable the collar to be wedged on fastening surfaces of the object(s) that is/are to be clamped, including in the regions of the interlocked connection ends. Naturally, this continuity in the cross-sectional shape of the belt is also possible with the above-described first embodiment. Conversely, in the second embodiment, the connection ends could be made flat as in FIGS. 1 to 5.

The joggle 116A of the connection end 111A offsets the end segment 117A radially outwards. Similarly, the joggle 116B of the connection end 111B offsets the end segment 117B radially outwards. As measured radially, the joggles are of equal height H, and that height is of the same order of magnitude as the thickness of the strip, while being slightly greater than said thickness. This makes it possible for the coupling segments to be covered by the end segments without said coupling segments giving rise to any extra thickness on the inside periphery of the belt.

The hooks 120A and 120B are folded over inside the recesses 127B and 127A formed in respective ones of the end segments 117B and 117A. The recesses are concave on the outside of the collar, so that the hooks do not project or hardly project radially outwards relative to the outside faces of the end segments 117A and 117B.

Figure 13:
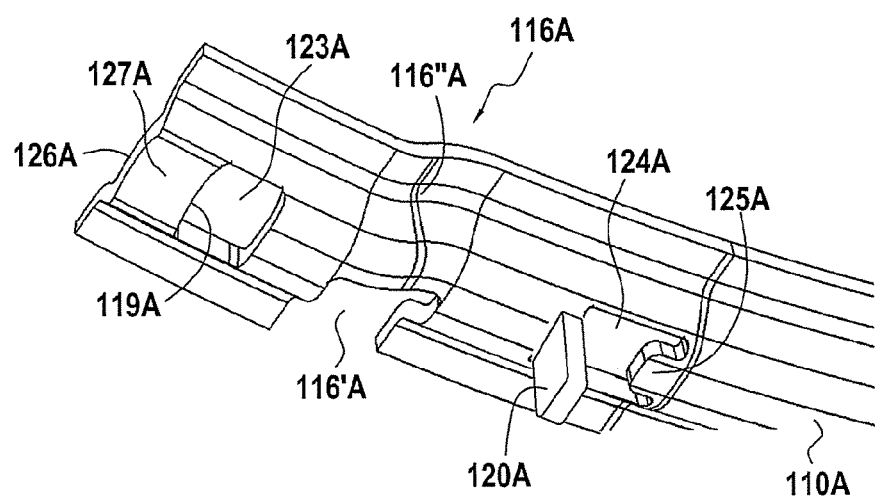
FIG. 13 shows a connection end of this collar at the end of manufacture, before it is assembled to another end.

In FIG. 13, the tongue serving to form the hook 120A is stood up radially substantially without extending circumferentially. After the connection ends are interconnected by interlocking, its end is folded over inside the recess 127B to form the hook 120A. The same applies for the other connection end.

Figure 11:
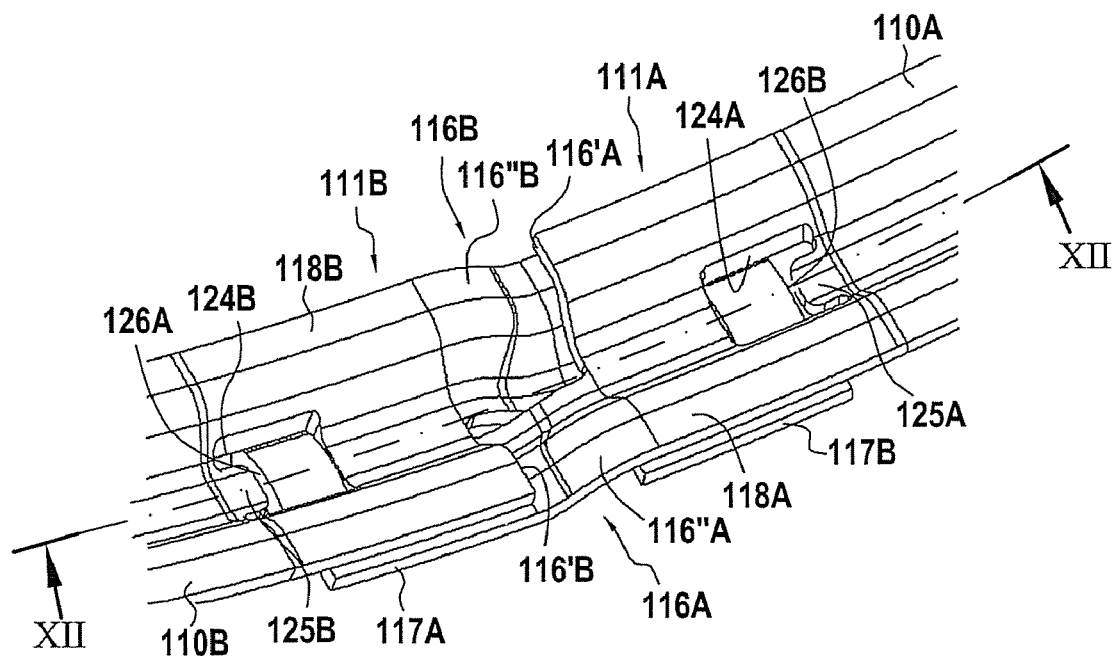
FIG. 11 is a view seen looking along arrow XI of FIG. 9.
Figure 12:
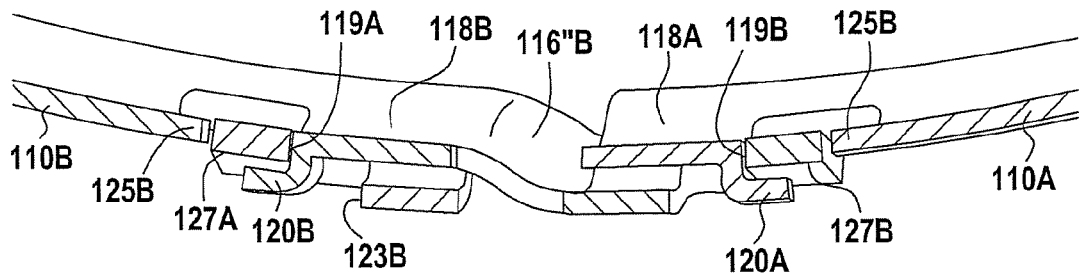
FIG. 12 is a view of the belt partially in circumferential section, as indicated by arrows XII-XII of FIG. 11.
Figure 14:
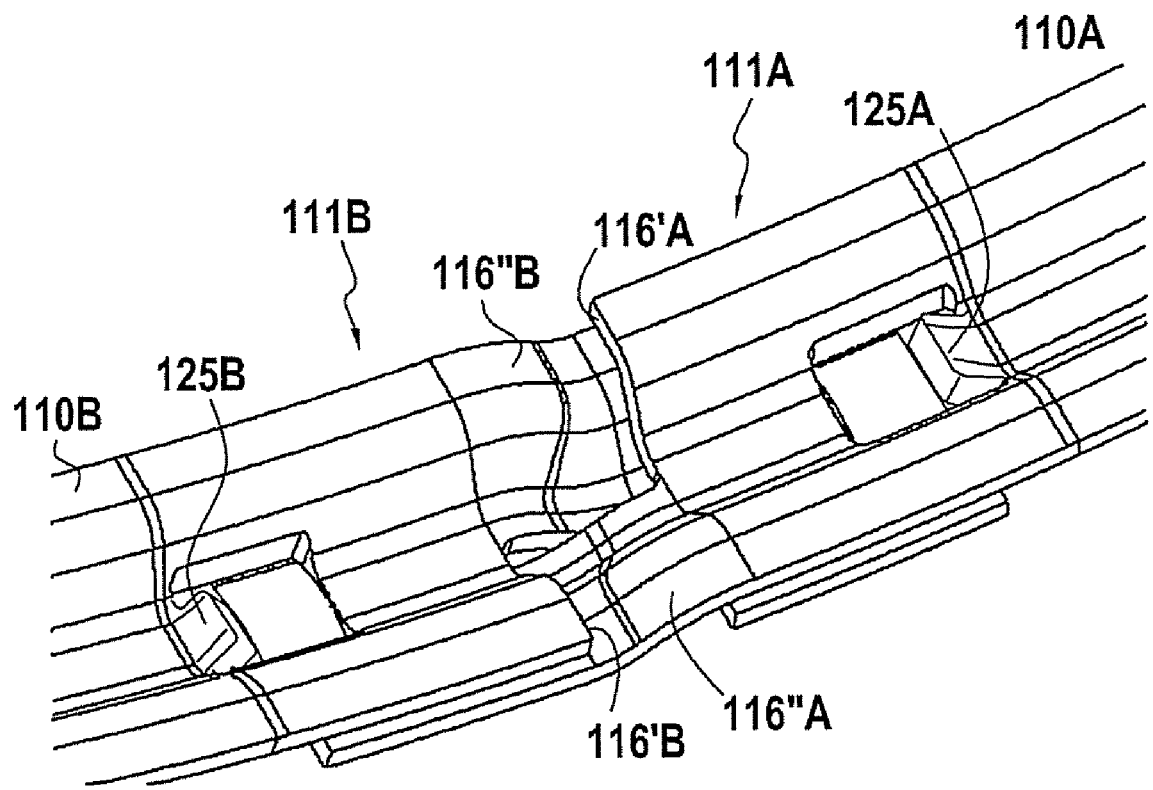
FIG. 14 is a view analogous to the FIG. 11 view for a variant embodiment.

FIG. 14 is a view analogous to FIG. 11, in which it can be seen that the tongues 125A and 125B are folded over radially towards the inside of the collar. In this way, said folded-over tongues can come to fasten into arrangements provided for that purpose in the surface of the inserted object(s), so as to wedge the collar angularly relative to the object(s).

Preferably, as indicated in the drawings, the connection ends are mutually identical.

It is even preferable, as in the example shown, when the belt is made up of two half-belts each covering 180°, for the two half-belts to be identical. Manufacture and assembly are thus made simpler.

What is claimed is:

1. A clamping collar comprising a belt that co-operates with tightening means, the belt having peripheral edges and comprising at least two belt portions suitable for being interconnected at adjacent connection ends, each of which connection ends has a joggle between an end segment and a coupling segment, the joggle of each connection end being provided with a slot that extends transversely from one of the peripheral edges of the belt to a step, the collar being provided with at least one pair of retaining surfaces comprising a first retaining surface situated in the end segment of the first connection end and a second retaining surface situated in the coupling segment of the second connection end, one of said retaining surfaces comprising an edge portion of a retaining window, and the other one of said retaining surfaces comprising a hook formed on an edge portion of a fastening window, wherein, in order to interconnect said belt portions, the connection ends are interlocked, the step of each connection end being disposed in the slot of the other connection end so that the coupling segment of each of the connection ends is disposed against the end segment of the other connection end, and so that said hook engages said edge to oppose relative movement of the connection ends in a first direction.

2. A clamping collar according to claim 1, that is further provided with a second pair of retaining surfaces comprising a first retaining surface situated in the end segment of the second connection end and a second retaining surface situated in the coupling segment of the first connection end, and the retaining surfaces of the second pair co-operating with each other when the connection ends are in the interlocked state.

3. A collar according to claim 1, wherein, opposite from said hook, the fastening window has a wedging edge suitable for co-operating with a wedging surface belonging to the other connection end to oppose relative movement of the connection ends in a second direction that is opposite from the first direction.

4. A clamping collar according to claim 1, wherein the edge portion of the retaining window has a radial recess in which the height of the joggle is compensated at least in part.

5. A clamping collar according to claim 4, wherein the hook is folded inside the recess.

6. A clamping collar according to claim 3, wherein the retaining window is formed in the end segment of a connection end, and wherein the wedging surface is formed at the free end of said end segment.

7. A clamping collar according to claim 1, wherein the edge of the fastening window is provided with two tongues, one of which forms the hook.

8. A clamping collar according to claim 1, wherein said edge portion of the retaining window and the hook are positioned transversely.

9. A clamping collar according to claim 1, wherein the height of the joggle is such that, when the connection ends are in the interlocked state, the inside faces of the segments disposed on the inside of the belt are substantially in circumferential alignment with the regions of said belt that are adjacent to the connection ends.

10. A clamping collar according to claim 1, wherein the connection ends are identical.

11. A clamping collar according to claim 1, wherein, for each connection end, the joggle offsets the end segment radially inwards relative to the coupling segment, and wherein, when the connection ends are in the interlocked state, and for each connection end, the coupling segment of one connection end is disposed on the outside of the end segment of the other connection end.

12. A clamping collar according to claim 1, wherein, for each connection end, the connection segment extends substantially in circumferential alignment with the region of the belt that is adjacent to the connection end in question, wherein the joggle of each connection end offsets the end segment radially outwards, and wherein, when the connection ends are in the interlocked state, and for each connection end, the end segment of one connection end is disposed on the outside of the coupling segment of the other connection end.

13. A clamping collar comprising a belt that co-operates with tightening means, the belt having peripheral edges and comprising at least two belt portions suitable for being interconnected at adjacent connection ends, each of which connection ends has a joggle between an end segment and a coupling segment, the joggle of each connection end being provided with a slot that extends transversely from one of the peripheral edges of the belt to a step, the collar being provided with at least one pair of retaining surfaces comprising a first retaining surface situated in the end segment of the first connection end and a second retaining surface situated in the coupling segment of the second connection end, one of said retaining surfaces comprising an edge portion a retaining window, and the other one of said retaining surfaces comprising a hook, said edge portion of the retaining window and the hook being positioned transversely, wherein, in order to interconnect said belt portions, the connection ends are interlocked, the step of each connection end being disposed in the slot of the other connection end so that the coupling segment of each of the connection ends is disposed against the end segment of the other connection end, and so that said hook engages said edge to oppose relative movement of the connection ends in a first direction.

14. A clamping collar according to claim 1, that is further provided with a second pair of retaining surfaces comprising a first retaining surface situated in the end segment of the second connection end and a second retaining surface situated in the coupling segment of the first connection end, and the retaining surfaces of the second pair co-operating with each other when the connection ends are in the interlocked state.

15. A clamping collar according to claim 13, wherein the height of the joggle is such that, when the connection ends are in the interlocked state, the inside faces of the segments disposed on the inside of the belt are substantially in circumferential alignment with the regions of said belt that are adjacent to the connection ends.

16. A clamping collar according to claim 13, wherein the connection ends are identical.

17. A clamping collar according to claim 13, wherein, for each connection end, the joggle offsets the end segment radially inwards relative to the coupling segment, and wherein, when the connection ends are in the interlocked state, and for each connection end, the coupling segment of one connection end is disposed on the outside of the end segment of the other connection end.

18. A clamping collar according to claim 13, wherein, for each connection end, the connection segment extends substantially in circumferential alignment with the region of the belt that is adjacent to the connection end in question, wherein the joggle of each connection end offsets the end segment radially outwards, and wherein, when the connection ends are in the interlocked state, and for each connection end, the end segment of one connection end is disposed on the outside of the coupling segment of the other connection end.

19. A clamping collar comprising a belt that co-operates with tightening means, the belt having peripheral edges and comprising at least two belt portions suitable for being interconnected at adjacent connection ends, each of which connection ends has a joggle between an end segment and a coupling segment, the joggle of each connection end being provided with a slot that extends transversely from one of the peripheral edges of the belt to a step, the collar being provided with at least one pair of retaining surfaces comprising a first retaining surface formed by an edge portion of a retaining window situated in the end segment of the first connection end and a second retaining surface formed by a hook situated in the coupling segment of the second connection end, wherein, in order to interconnect said belt portions, the connection ends are interlocked, the step of each connection end being disposed in the slot of the other connection end so that the coupling segment of each of the connection ends is disposed against the end segment of the other connection end, said edge portion being formed in a radial recess such that said edge portion is substantially in circumferential alignment with the coupling segment of the first connection end, and so that the retaining surfaces of the first pair co-operate with each other.

20. A clamping collar according to claim 19, that is further provided with a second pair of retaining surfaces comprising a first retaining surface situated in the end segment of the second connection end and a second retaining surface situated in the coupling segment of the first connection end, and the retaining surfaces of the second pair co-operating with each other when the connection ends are in the interlocked state.

21. A clamping collar according to claim 19, wherein the hook is folded inside the recess.

22. A clamping collar according to claim 19, wherein the connection ends are identical.

* * * * *